United States Patent
Eisenbeis et al.

(10) Patent No.: US 7,580,992 B2
(45) Date of Patent: **\*Aug. 25, 2009**

(54) DOWNLOADABLE CODE IN A DISTRIBUTED PROCESS CONTROL SYSTEM

(75) Inventors: Clyde T. Eisenbeis, Marshalltown, IA (US); Brent H. Larson, Dallas, TX (US); Steve A. Packwood, Omaha, NE (US); Larry K. Brown, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 966 days.

This patent is subject to a terminal disclaimer.

(21) Appl. No.: 10/886,272

(22) Filed: Jul. 6, 2004

(65) Prior Publication Data

US 2005/0097194 A1   May 5, 2005

Related U.S. Application Data

(63) Continuation-in-part of application No. 09/408,028, filed on Sep. 29, 1999, now Pat. No. 6,850,973.

(51) Int. Cl.
   *G06F 15/177* (2006.01)
(52) U.S. Cl. .............. 709/221; 709/203; 709/208; 709/220; 700/117; 700/83; 713/1; 713/100; 713/2
(58) Field of Classification Search ......... 709/203, 709/208, 220–221; 700/83, 117; 713/1, 713/2, 100
   See application file for complete search history.

(56) References Cited

U.S. PATENT DOCUMENTS 4,707,825 A   11/1987   Amstutz et al. .............. 370/60
5,162,986 A   11/1992   Graber et al. ............... 364/146
5,428,769 A    6/1995   Glaser et al. ................ 395/575

(Continued)

FOREIGN PATENT DOCUMENTS

DE   43 21 774   6/1994

(Continued)

OTHER PUBLICATIONS

PCT/US00/40619 International Search Report dated Jan. 16, 2001.

(Continued)

*Primary Examiner*—Ashok B. Patel
*Assistant Examiner*—Robert B McAdams
(74) *Attorney, Agent, or Firm*—Marshall, Gerstein & Borun LLP (57) ABSTRACT

The present invention is directed to a method of reprogramming a field device in a process control network using the standard communications protocol for the network, and a reprogrammable field device in the process control network adapted for being reprogrammed using the standard communications protocol for the network. The method and device of the present invention use the standard communications protocol to transmit the downloaded code to the field device and store the downloaded code in the field device while the device is enabled to perform process control. Once the new code is downloaded and stored in the field device, the field device is set to a steady state condition and/or disabled from performing process control, reprogrammed to execute the downloaded code, and reenabled to perform process control.

40 Claims, 2 Drawing Sheets

U.S. PATENT DOCUMENTS

| | | | | |
|---|---|---|---|---|
| 5,487,161 | A | 1/1996 | Koenck et al. | 395/442 |
| 5,548,640 | A | 8/1996 | Blondel et al. | 379/242 |
| 5,564,108 | A | 10/1996 | Hunsaker et al. | 395/800 |
| 5,635,979 | A | 6/1997 | Kostreski et al. | 348/13 |
| 5,668,591 | A | 9/1997 | Shintani | 348/12 |
| 5,970,430 | A | 10/1999 | Burns et al. | 702/122 |
| 5,987,511 | A | 11/1999 | Elixmann et al. | 709/221 |
| 6,055,633 | A | 4/2000 | Schrier et al. | 713/100 |
| 6,850,973 | B1 * | 2/2005 | Larson et al. | 709/221 |

FOREIGN PATENT DOCUMENTS

| | | |
|---|---|---|
| DE | 43 32 063 | 3/1995 |
| DE | 195 18 266 | 11/1996 |
| DE | 195 25 100 | 1/1997 |
| DE | 197 01 322 | 7/1998 |
| EP | 0 687 975 | 12/1995 |
| WO | WO 99/22489 | 6/1999 |

OTHER PUBLICATIONS

PCT Written Opinion dated May 25, 2001.

Fieldbus Foundation, "Top Level Plan for the Fieldbus Foundation, Common Device Software Download Specification Development Project," Confidential Document FF-540 Revision 0.1.

Schrier, Matthew, "Devices Upgrades Made Easy with Fieldbus," Honeywell Inc., Undated.

Fieldbus Foundation, "Foundation Specification System Management Addendum for Software Download," Confidential Document FF-883, Dec. 21, 1999.

International Standard CEI/IEC 1158-2 First Edition Dec. 1993, pp. 1, 3 and 25.

* cited by examiner

FIG. 1

DOWNLOADABLE CODE IN A DISTRIBUTED PROCESS CONTROL SYSTEM

REFERENCE TO RELATED APPLICATION

This application is a continuation-in-part of U.S. patent application Ser. No. 09/408,028, filed Sep. 29, 1999, by Brent Hans Larson, Steve Allen Packwood and Larry Keith Brown, which is expressly incorporated by reference herein.

FIELD OF THE INVENTION

The present invention relates generally to process control systems and, more particularly, to a system wherein field devices are reprogrammed with software downloaded via the system's standard communication protocol.

DESCRIPTION OF THE RELATED ART

Distributed process control systems, like those used in chemical, petroleum or other processes, typically include one or more process controllers communicatively coupled to one or more field devices via analog, digital or combined analog/digital buses. The field devices, which may be, for example, valves, valve positioners, switches and transmitters (e.g., temperature, pressure and flow rate sensors), are located within the process environment and perform process functions such as opening or closing valves, measuring process parameters, etc. Smart field devices, such as the field devices conforming to the well-known Fieldbus protocol may also perform control calculations, alarming functions, and other control functions typically implemented within the controller. The process controllers, which are also typically located within the plant environment, receive signals indicative of process measurements made by the field devices and/or other information pertaining to the field devices and execute a controller application that runs, for example, different control modules which make process control decisions, generate control signals based on the received information and coordinate with the control modules or blocks being performed in the field devices, such as Fieldbus field devices. The control modules in the controller send the control signals over the communication lines to the field devices to thereby control the operation of the process.

Information from the field devices and the controller is usually made available over a data highway, or bus, to one or more other hardware devices, such as operator workstations, personal computers, data historians, report generators, centralized databases, etc. typically placed in control rooms or other locations away from the harsher plant environment. These hardware devices run applications that may, for example, enable an operator to perform functions with respect to the process, such as changing settings of the process control routine, modifying the operation of the control modules within the controller or the field devices, viewing the current state of the process, simulating the operation of the process for the purpose of training personnel or testing the process control software, keeping and updating a configuration database, etc.

The process control industry has developed a number of standard, open communication protocols including, for example, the FOUNDATION™ Fieldbus, HART®, PROFIBUS®, WORLDFIP®, LONWORKS®, Device-Net®, and CAN protocols, which enable field devices made by different manufacturers to be used together within the same process control network. In fact, any field device that conforms to one of these protocols can be used within a process to communicate with and to be controlled by a controller that supports the protocol, even if that field device is made by a different manufacturer than the manufacturer of the DCS controller. The communication protocols enable the controllers and field devices to transmit and receive process control information and non-process control information, such as alarm messages, trend data, set point changes, etc.

For example, the FOUNDATION™ Fieldbus protocol promulgated by the Fieldbus Foundation is an all-digital, two-wire bus protocol that allows devices to interoperate and communicate with one another via a standard bus in a process control network. In order to implement a control strategy in the process control network, the operation of the field devices and the exchange of process control information must be precisely scheduled so that proper data is provided to each field device before the information is needed. At the same time, field devices and controllers must be able to communicate non-process control information over the network without affecting the execution of process control by the network. The Fieldbus protocol facilitates the transmission of both types of information by providing for both scheduled (synchronous) and unscheduled (asynchronous) communications.

A communication schedule for the process control network contains the times that each control module of each device is scheduled to start periodic communication activity on the bus and the length of time for which the communication activity is to occur. In general, communication activities over the bus are divided into repeating macrocycles, each of which includes one synchronous communication for each control module active on any particular segment of the bus and one or more asynchronous communications for one or more of the control modules or devices active on a segment of the bus.

During each macrocycle, each of the control modules active on a particular segment of the bus executes, usually at a different, but precisely scheduled (synchronous) time and, at another precisely scheduled time, publishes its output data on that segment of the bus in response to a compel data command generated by a scheduling device that stores and controls execution of the process schedule. Preferably, each control module is scheduled to publish its output data shortly after the end of the execution period of the control module. Furthermore, the data publishing times of the different control modules are scheduled serially so that no two control modules on a particular segment of the bus publish data at the same time. During the time that synchronous communication is not occurring, each field device is allowed, in turn, to transmit non-process control information as well as additional process control data in an asynchronous manner using token driven communications. The execution times and the amount of time necessary to complete execution of each control module are stored in the device in which the control module resides while, as noted above, the times for sending the compel data commands to each of the devices on a segment of the bus are stored in the scheduling device for that segment.

To effect communications during each macrocycle, the scheduling device of the bus segment sends a compel data command to each of the devices on the bus segment according to the list of transmit times stored in the scheduling device. Upon receiving a compel data command, a control module of a device publishes its output data on the bus for a specific amount of time. After the scheduling device has sent a compel data command to each of the control modules on a particular segment of the bus and during the times that control modules are executing, the scheduling device may cause asynchronous communication activities to occur. To effect asynchronous communication, the scheduling device sends a pass token message to a particular field device. When a field device receives a pass token message, that field device has full access to the bus (or a segment thereof) and can send asynchronous messages until the messages are complete or until a maximum allotted "token hold time" has expired. Thereafter the field device releases the bus (or any particular segment thereof) and the scheduling device sends a pass token message to another device. This process repeats until the end of the macrocycle or until the scheduling device is scheduled to send a compel data command to effect synchronous communication. Of course, depending on the amount of message traffic and the number of devices and control modules coupled to any particular segment of the bus, not every device may receive a pass token message during each macrocycle.

Another example of a standard communication protocol, the HART protocol, uses twisted pair wiring with combined analog/digital capabilities to allow communications between field devices in a process control network. Under the HART protocol, process control information is transmitted using a 4-20 mA analog signal, with the magnitude of the signal being indicative of the value of the process control variable being transmitted. The HART protocol also provides a digital signal superimposed over the analog signal that may be used to communicate both process control and non-process control information. Digital communications in the HART protocol are unscheduled (similar to Fieldbus asynchronous communications), bi-directional, and primarily implemented through master/slave communications. The master device issues commands in request/response format to the slave device. The slave responds to the request by transmitting the requested information back to the master to complete the exchange. Alternatively, the slave can operate in burst mode, wherein the slave sends out packets of information in a known format as a broadcast message that is detected and received by the host device. Although the HART protocol is implemented in a process control network with a different physical configuration than the Fieldbus protocol, the HART protocol, like the Fieldbus and other communications protocols, allows transmission of non-process control information without affecting the network's ability to perform process control.

Each field device is programmed with software or firmware that controls the operation of the device and that implements one or more process control modules. The first generation of electronic process control instruments and field devices were programmed with ROM-based software or some other non-reprogrammable memory. The devices functioned satisfactorily for their original intended purpose, but it was difficult or impossible to reprogram the devices to, for example, correct a software problem or defect, introduce new functionality for the device, improve the performance of the device, etc. If one of these devices required reprogramming, the electronics module was removed and replaced by a new module programmed with the repaired or upgraded software. In some cases, the electronics module was not replaceable and the field device had to be replaced with a different device that implemented the corrected software or additional functionality. In either case, the process was interrupted while the field device was updated.

Subsequent generations of process control instruments have evolved from ROM-based software to reprogrammable devices. The evolution of the reprogrammable devices has been facilitated by improvements in non-volatile memory (NVM). In one implementation of a reprogrammable device, the electronics module of the device is removed, the NVM is reprogrammed with the corrected or updated firmware, and reinstalled in the device. This implementation eliminates the need for a new electronics module each time the firmware is changed, but the person reprogramming the NVM is still required to go to the location of the device to perform the firmware upgrade. Moreover, as with the first generation devices, at a minimum, some or all process control functions are suspended while the device is reprogrammed. In extreme cases, the entire process must be shut down.

In another implementation of a reprogrammable device, the electronics module is not removed from the device, but reprogramming of the device is effected by attaching a downloading device to a communications port of the field device. In this way, code is downloaded to the field device without disassembling the device. However, this implementation of a reprogrammable device does not eliminate the need to send a person out to the location of the field device to reprogram the device or of suspending process control while the code is downloaded.

Yet another implementation of a reprogrammable device facilitates downloading code remotely from a host device of the process control system. In this implementation, the code is transmitted to the device over the data highway or bus of the process control system. The download is initiated at the host device in the control room, and the host device transmits the code over the bus. Currently, the host device performs the download using either a standard communication protocol for the process control system which allows other devices to operate, or a non-standard communication protocol that is recognized by the host and the device but not necessarily by the other devices connected to the bus. Regardless of the protocol used to communicate the code, the host takes control of the bus, thereby preventing communications between the other devices connected to the bus during the download. This implementation is an improvement over the other implementations because it eliminates the need to send a person to the location of the device, but the host device usurps control of the bus for the duration of the download. Consequently, as with the other implementations, the process control system is partially or completely taken out of service while the code is downloaded to the field device.

These examples illustrate reprogrammable devices developed by the process control industry that eliminate the necessity of changing the hardware of the devices or going to the physical location of the device to perform software and/or firmware downloads. However, despite the devices' ability to be reprogrammed, the presently known methods for reprogramming the devices require taking the process control system partially or completely out of service for the duration of the downloading and reprogramming the devices, a process that may require as much as a half of a day interruption of service to reprogram a single field device. This results in the reduction of the output of the controlled process caused by the periods of suspended operations and increased labor cost (where manual reprogramming of the field devices is required).

SUMMARY OF THE INVENTION

The present invention is directed to a method of reprogramming a field device in a process control network using the standard communications protocol for the network, and a reprogrammable field device in the process control network adapted for being reprogrammed using the standard communications protocol for the network. The method and device of the present invention use the standard communications protocol to transmit the downloaded code to the field device and store the downloaded code in the field device while the device is enabled to perform process control. Once the new code is downloaded and stored in the field device, the field device is disabled from performing process control, reprogrammed to execute the downloaded code, and reenabled to perform process control.

By using the standard communications protocol for the process control network during the regular operation of the network, the new code is downloaded to the reprogrammable field device without interrupting the performance of process control by either the reprogrammable field device or the other devices in the network, thereby reducing the amount of time the process control network is placed out of service while the field device is reprogrammed. Although the field device must be taken out of service and/or maintained at a steady to be reprogrammed to execute the downloaded code, the amount of time the field device is out of service for reprogramming, in most instances, is substantially less than the time required to download the code over the network. Consequently, the extent of the disruption to the process control network due to reprogramming the field device is significantly reduced compared to previous methods and devices that required suspending process control during both the downloading of code and the reprogramming of the field device. Moreover, by using the standard communication protocol of the process control network, the amount of additional coding required to implement the method and device of the present invention is greatly reduced because the functionality for communicating messages, error checking, and the like are already present in the standard communications protocols.

According to one aspect of the present invention, a method of reprogramming a field device in a process control network having a plurality of devices communicatively linked on a bus includes the steps of downloading the program instructions from a host device to the field device using the standard communication protocol used in the process control network while the field device performs process control, storing the downloadable program instructions in the field device, and causing the field device to execute the downloadable program instructions. The standard communication protocol may provide both scheduled and unscheduled communications, such as the communications supported by the Fieldbus protocol, with the host device transmitting the downloadable program instructions via one or more unscheduled queued communications. Moreover, the standard communication protocol may provide for analog and digital communications, such as the communications supported by the HART protocol, with the host device transmitting the downloadable program instructions via one or more digital communications. Additionally, the downloadable program instructions may be divided into data packets that are transmitted by the host device over time and reassembled by the field device.

In one embodiment of the method according to the present invention, the field device has a storage device having a first memory portion and a second memory portion, with the downloadable program instructions being stored in the second memory portion of the storage device while the field device is capable of executing stored program instructions stored in the first memory portion. According to one embodiment, the field device is reprogrammed by copying the downloadable program instructions from the second memory portion to the first memory portion, and subsequently executing the downloadable program instructions in the first memory portion. In another embodiment, the field device ceases executing the stored program instructions in the first memory portion and is redirected to execute the downloadable program instructions in the second memory portion of the storage device.

According to another aspect of the present invention, a system for reprogramming field devices is provided in a process control network having a plurality of devices communicatively linked over a bus, wherein each of the devices is capable of performing a process function and of communicating on the bus using a standard communications protocol. The system includes a first device that generates input signals including downloadable program instructions and a second device capable of receiving the input signals transmitted over the bus. The second device includes a processor adapted to execute program instructions stored in the second device, a storage device having a first memory portion adapted to store program instructions that may be executed by the processor, and a second memory portion adapted to store the downloadable program instructions received in the input signals. The first device transmits the input signals to the second device over the bus and the second device receives the input signals and stores the downloadable program instructions in either the first or the second memory portion of the storage device. The second device stores the downloadable program instructions while the processor is enabled to execute stored program instructions to perform process control. The standard communications protocol may include scheduled and unscheduled communications, with the first device transmitting the input signals using unscheduled queued communications. Alternatively, the standard communication protocol may include analog and digital communications, with the first device transmitting the input signals using digital communications.

The features and advantages of the invention will be apparent to those of ordinary skill in the art in view of the detailed description of the preferred embodiment, which is made with reference to the drawings, a brief description of which is provided below.

DESCRIPTION OF THE PREFERRED EMBODIMENTS

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention since describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

Figure 1:
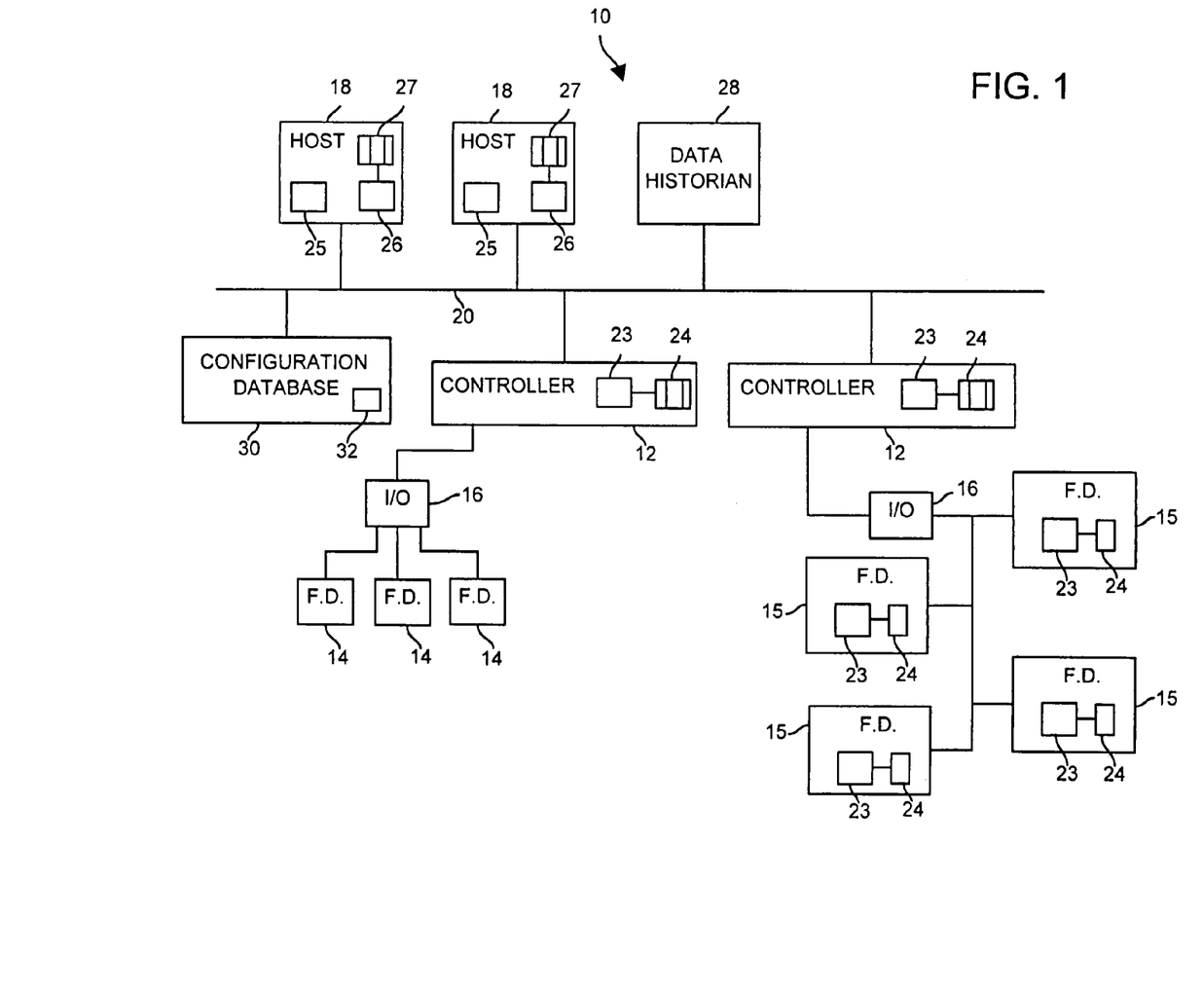
FIG. 1 is a block diagram of a typical process control network having different process control functions performed by different hardware devices and capable of downloading code to the field devices.

Referring now to FIG. 1, a distributed process control system 10 includes one or more dedicated process controllers 12 each connected to one or more field devices 14 and 15 via input/output (I/O) modules 16 which may be, for example, Fieldbus or HART interfaces. The controllers 12 are also coupled to one or more host or operator workstations 18 via a data highway 20 which may be, for example, an Ethernet link. While the controllers 12, I/O modules 16 and field devices 14 and 15 are located down within and distributed throughout the harsh plant environment, the operator workstations 18 are usually located in control rooms or other less harsh environments easily assessable by controller personnel. Each of the controllers 12, which may be by way of example, the DeltaV controller sold by Fisher-Rosemount Systems, Inc., stores and executes a controller application 23 that implements a control strategy using a number of different, independently executed, control modules 24. The control modules 24 may each be made up of what are commonly referred to as function blocks wherein each function block is a part or a subroutine of an overall control routine and operates in conjunction with other function blocks (via communications called links) to implement process control loops within the process control system 10. As is well known, function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course hybrid and other types of function blocks exist. However, the control modules 24 could be designed using any desired control programming scheme including, for example, sequential function block, ladder logic, etc. and are not limited to being designed using function block or any other particular programming technique.

In the system illustrated in FIG. 1, the field devices 15 connected to one of the controllers 12 are smart field devices, such as Fieldbus field devices, which include a processor and a memory. These devices store and execute the controller application 23 as well as modules 24, or sub-parts, such as function blocks, of one or more of the modules 24. The modules or parts of modules within the field devices 15 may be executed in conjunction with the execution of the modules within the controller 12 to implement process control as is known. Similarly, one or more of the field devices 14 connected to another controller 12 may also be smart field devices, such as HART field devices, with controller application 23 and control modules 24 executed to implement process control.

The host workstation 18 stores and executes a configuration application 25 that is used to create or change the process control modules 24 and to download these control modules via the data highway 20 to one of the controllers 12 and/or to field devices such as one of the field devices 15. The host workstation 18 may also store and execute a viewing application 26 that receives data from the controller 12 via the data highway 20 and that displays this information via a display mechanism using predefined user interfaces 27 or views, typically created using the configuration application 25. In some cases, the viewing application 26 receives inputs, such as set point changes, from the user and provides these inputs to the controller application 23 within one or more of the controllers 12.

A data historian 28 is connected to the data highway 20 and stores data in a memory therein using any desired or known data historian software. However, the data historian could alternatively be in one or more of the workstations 18 if so desired. Furthermore, a configuration database 30 runs a configuration database application 32 that stores the current configuration of the process control system and data associated therewith.

Figure 2:
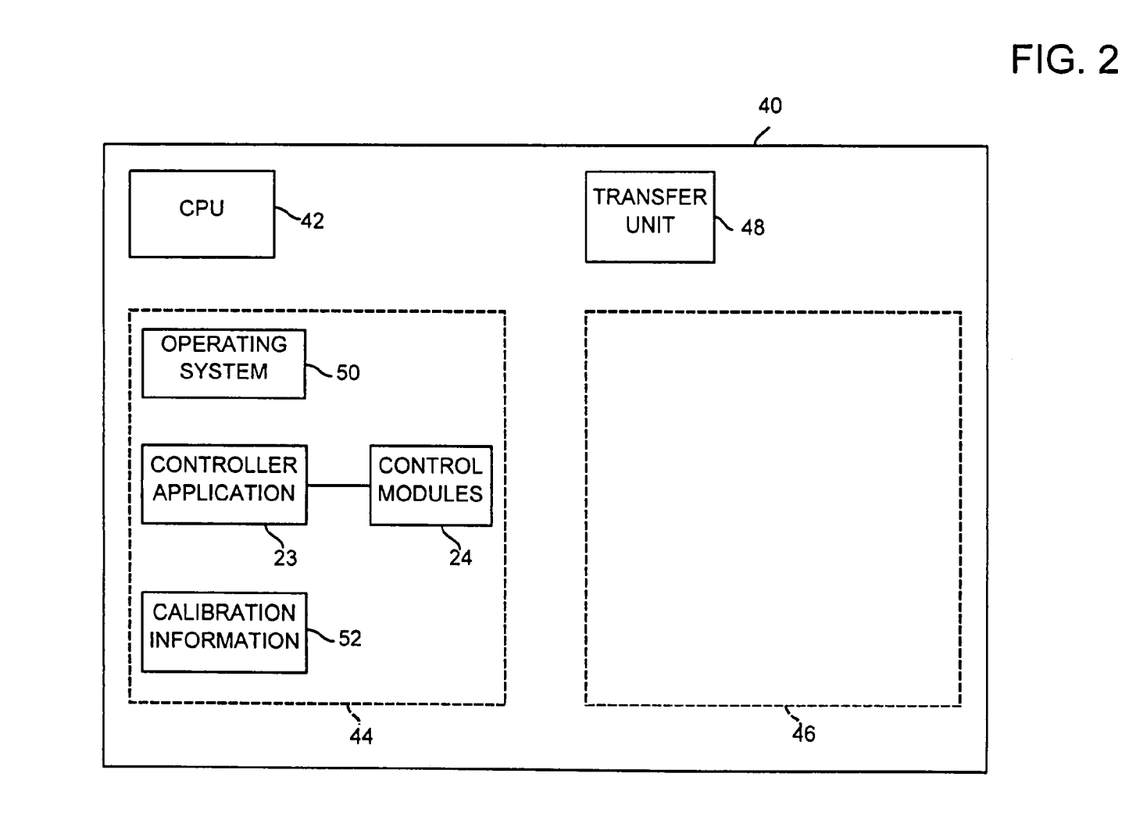
FIG. 2 is a block diagram of a reprogrammable field device capable of being reprogrammed using the standard communications protocol in a distributed process control system like that of FIG. 1.

Referring now to FIG. 2, a reprogrammable field device 40 is a smart device having a CPU 42, a first memory 44, a second memory 46, and a transfer unit 48. The reprogrammable field device 40 is typically connected to a controller 12 via an input/output device 16, and one or all of the field devices 14, 15 of FIG. 1 may be reprogrammable field devices 40. The reprogrammable field devices 40 are also capable of communicating with other devices connected over a bus or other communication link using the standard communications protocol (such as the HART or Fieldbus protocol) used by that bus or other communication link.

In the embodiment of FIG. 2, the reprogrammable field device 40 stores the control application 23 and the control modules 24 in the first memory 44, and may also store the operating system software 50 for the reprogrammable field device 40, and any other software for the reprogrammable field device 40 that is intended to be reprogrammable. Other types of data, such as calibration data 52, could be stored in the first memory 44 or in some other memory location or memory device where the data will not be corrupted by a code download. During normal operation of the reprogrammable field device 40, the CPU 42 executes the code stored in the first memory 44 to operate the reprogrammable field device 40 and to perform the process control functions required by the process control system 10.

The second memory 46 of the reprogrammable field device 40 stores newly downloaded code that is used to reprogram the reprogrammable field device 40. When the reprogrammable field device 40 receives the input message over the data highway 20 containing the downloadable code, the CPU 42 writes the downloadable code into the second memory 46. The downloadable code may be received and stored in the second memory 46 while the reprogrammable field device 40 is operational and the CPU 42 is capable of concurrently executing code stored in the first memory 44 to perform process control. Once the code is completely downloaded into the second memory 46, the reprogrammable field device 40 is taken out of service or is set to some other non-operational or steady state for a relatively short period of time while the reprogrammable field device 40 is reprogrammed to execute the downloaded code.

The process of storing newly downloaded code and reprogramming the reprogrammable field device 40 is controlled by the transfer unit 48. The transfer unit 48 may be implemented as part of the CPU 42, as a separate CPU on its own, or as separate logic executed by the CPU 42 to control the code storage and reprogramming of the reprogrammable field device 40. When the reprogrammable field device 40 receives the input messages with the downloaded code, the transfer unit 48 causes the CPU 42 to write the downloaded code to the proper location in either the first memory 44 or second memory 46 as will be described more fully below. Once the downloaded code is stored, the transfer unit 48 may cause the reprogrammable field device 40 to go out of service or set the device 40 to some other non-operational or steady state while the device is reprogrammed. Moreover, the transfer unit 48 controls the reprogramming of the device 40 by causing the CPU 42 to execute the downloaded code, and the resumption of normal process control operations by the reprogrammable field device 40.

Although the first memory 44 and the second memory 46 are illustrated in separate blocks in FIG. 2, the first and second memories 44, 46, respectively, are not constrained to a particular physical or operational relationship, or to being implemented by a particular type of storage device. For example, in one embodiment of a reprogrammable field device 40, the first memory 44 is a reprogrammable NVM storage device, such as flash memory, and the second memory 46 is a temporary memory storage device, such as classical RAM or other type of RAM, or a different type of NVM storage device than the NVM of the first memory 44. When the new code is downloaded over the data highway 20, the transfer unit 48 causes the temporary storage of the downloaded code in the second memory 46. Once the download is complete, the transfer unit 48 takes the reprogrammable field device 40 out of service and causes the transfer of the downloaded code from the second memory 46 into the proper location in the flash memory of the first memory 44. For example, if the downloaded code contains a new or repaired operating system for the reprogrammable field device 40, the downloaded code is written to the NVM of the first memory 44 at the storage location for the operating system 50. Moreover, if the downloaded code includes additional functionality for the reprogrammable field device 40 in the form of a new control module 24, the downloaded code for the new control module 24 may be written to a vacant storage location in the NVM of the first memory 44 while the code for the control application 26 is updated with any additional functionality and with the address for the new control module 24. Once the downloaded code in the second memory 46 is written into the NVM of the first memory 44, the transfer unit 48 returns the reprogrammable field device 40 to its normal operational mode with the CPU 42 executing the new downloaded code now stored in the first memory 44.

In another embodiment of the reprogrammable field device 40, the reprogrammable field device 40 is capable of executing code stored in either the first memory 44 or the second memory 46. For example, both the first memory 44 and the second memory 46 could be NVM storage devices, with both storage devices having the capacity to store the same reprogrammable code. Consequently, the second memory 46 would be able to store control applications 23, control modules 24, operating system software 50, and any other information stored in the first memory 44. In this embodiment, the transfer unit 48 includes a pointer or storage for an address that indicates to the CPU 42 which memory 44, 46 to access for execution of the reprogrammable code.

Applying this embodiment to the reprogrammable field device 40 of FIG. 2, the pointer in the transfer unit 48 is initially set to direct the CPU 42 to execute the code stored in the NVM of the first memory 44 while the NVM of the second memory 46 sits idle. When code for reprogramming the reprogrammable field device 40 is transmitted over the data highway 20 to the reprogrammable field device 40, the transfer unit 48 causes the CPU 42 to write the downloadable code into the NVM of the second memory 46. The downloaded code updates or replaces the code previously stored in the NVM of the second memory 46. After the code download is complete, the transfer unit 48 takes the reprogrammable field device 40 out of service and updates the pointer to cause the CPU 42 to execute the downloaded code currently stored in the NVM of the second memory 46, thereby reprogramming the device 40. After the pointer is updated, the reprogrammable field device 40 can be placed back in service for normal operation according to the newly downloaded code in the NVM of the second memory 46. Once the reprogrammable field device 40 is reprogrammed to execute the downloaded code in the second memory 46, the next instance of downloading code will result in storing the downloaded code in the NVM of the first memory 44 and subsequently reprogramming the CPU 42 to execute the downloaded code in the first memory 44. In this embodiment of the reprogrammable field device 40, it may also be necessary to copy the current version of the downloaded code from the executing memory to the idle memory to ensure that the latest version of the reprogrammable field device 40's software is updated by subsequent code downloads. The copying can occur either during the reprogramming cycle or, to reduce the disruption to the process control system 10, during a period when the reprogrammable field device 40 is operational but not performing process control, or could be performed live as a background task since the software is being run out of a separate memory.

In yet another embodiment, the reprogrammable field device 40 has a single NVM storage device with read/write capability. The NVM storage device is partitioned to create the first memory 44 and the second memory 46. As in the previously described embodiment, a pointer in the transfer unit 48, which may be implemented in the NVM storage device, directs the CPU 42 to execute the downloaded code in the partition containing the current version of code for the reprogrammable field device 40. When new code is downloaded to the reprogrammable field device 40, the downloaded code is written into the idle partition of the NVM storage device and, when the download is complete, the reprogrammable field device 40 is reprogrammed to execute the newly downloaded code in the previously idle partition of the NVM storage device. Alternatively, downloaded code may be written into the idle partition of the NVM storage device and, once the download is complete, copied to the other partition for execution by the CPU 42.

The NVM storage device may be any NVM storage device capable of being configured and partitioned to create two or more memory portions for reading and writing program instructions. One example of such a NVM storage device is the model number IS71V16F32GSB08 32 Mbit Simultaneous Operation Flash Memory and 8 Mbit Static RAM manufactured and distributed by Integrated Silicon Solutions, Inc. (ISSI), and described in the specification entitled "IS71V08F32GSx08/IS71V16F32GSx08: 3.0 Volt-Only Flash & SRAM COMBO with Stacked Multi-Chip Operation Flash Memory and 8 MBit Static RAM Preliminary Information," dated Oct. 21, 2002, which is expressly incorporated by reference herein. The ISSI stacked multi-chip storage device allows simultaneous read and write operations so that data may be programmed or erased in one memory portion while data is simultaneously being read from the other memory portion. Consequently, when the ISSI stacked multi-chip storage device may be implemented as the NVM storage device in the reprogrammable field device 40, downloaded code received by the reprogrammable field device 40 may be written to the second memory 46 of the NVM storage device simultaneously with reading and executing code stored in the first memory 44 to perform process control operations at the reprogrammable field device 40.

In these embodiments where the reprogrammable field device 40 may execute code out of either the first memory 44 or the second memory 46, it may be possible to have different versions of code available to the reprogrammable field device 40 for execution at the same time. For example, when the reprogrammable field device 40 is reprogrammed by downloading new code, one of the memories 44, 46 may store the newly downloaded version of code, while the other of the memories 44, 46 may still store the previous version of the code. Despite the controls built into the process for successfully downloading code and reprogramming the field device 40, undetected errors may occur during the downloading of the code, or programming or other errors unrelated to the downloading of the code may exist within the code such that the reprogrammable field device 40 may not function as desired after being reconfigured to execute the downloaded code. In such situations, it may be possible to cause the reprogrammable field device 40 to return to executing the previous version of the code stored in the one of the memories 44, 46 when the CPU 42, other component of the process control system 10, or system operator detects an error or errors in the downloaded code so that the field device 40 may operate to perform process control, albeit under the previous version, while the errors in the downloaded code may be corrected. Once the errors in the downloaded code are corrected, the field device 40 may again be reconfigured to execute the current version of the downloaded code.

The operations of downloading code and reprogramming the reprogrammable field device 40 are effected using the standard communications protocol of the process control system 10 and may be completed while the reprogrammable field device 40 is operational within a process control network with only minimal affect on the execution of the process control network. The download is initiated by a host 18 into which the new code has been loaded. Prior to the actual download of the code, the host 18 may transmit a message to a controller 12 which then transmits a message to the reprogrammable field device 40 that instructs the reprogrammable field device 40 that the host 18 (or controller 12) is going to download code to the reprogrammable field device 40. The initial message from the host 18 may contain information pertaining to the type of code being downloaded (operating system, control applications, control modules, etc.), the version of the code being downloaded, the amount of storage space required for the downloaded code, and the like. Upon receiving the initial message from the host 18, the reprogrammable field device 40 prepares to receive the downloaded code in one or more subsequent messages from the host 18, and responds to the host 18 with a message indicating that it is prepared to receive the code. The response message from the reprogrammable field device 40 may include additional information for the host 18 such as storage constraints, the version of the software currently running in the reprogrammable field device 40, and the like.

Once the host 18 receives the response from the reprogrammable field device 40, the host 18 can begin downloading the code to the reprogrammable field device 40. The code is transmitted to the reprogrammable field device 40 over the data highway 20 and then over a protocol bus or link (such as those associated with the HART or Fieldbus protocols) using the standard communications protocol for the process control system 10. Depending on the volume of code to be downloaded, the transfer may require either a single transmission from the host 18, or the transmission of multiple packets of data. The number of transmissions required will also depend on the speed of the data highway 20 and the protocol communication link, the amount of time allotted to the controller 12 in the process control schedule for transmitting data, the speed with which the storage device in the reprogrammable field device 40 can parse and store the data, etc. As the reprogrammable field device 40 receives each of the download transmissions from the host 18 (or controller 12), the data is reassembled in the storage device for proper execution by the CPU 42 of the reprogrammable field device 40. As the transmissions are received by the reprogrammable field device 40, the standard transmission verification of the communications protocol, such as checksums, is used to ensure that each transmission is received properly by the reprogrammable field device 40.

As the new code is downloaded from the host 18, the reprogrammable field device 40 stores the downloaded code in either volatile or non-volatile memory in a manner as previously described or in some manner as required by the storage device. It is important to note at this point that the use of the standard communications protocol allows the reprogrammable field device 40 to remain operational during the downloading and storage of the new code. For example, in the Fieldbus protocol, the new code is downloaded using asynchronous communications when the I/O device associated with the controller 12 and the reprogrammable field device 40 receive their pass token messages. Concurrently, the control modules 24 of the reprogrammable field device 40 and of the other field devices 14, 15, 40 are operating within their control loops to perform process control and transmit process control information according to the synchronous schedule. Similarly, in networks implementing the HART protocol, the downloaded code is transmitted over the twisted pair wiring in the digital overlay while the process control information is communicated by the analog signal. Consequently, process control is unaffected by the downloading of code to the reprogrammable field device 40. Moreover, by using the data highway 20 and the appropriate protocol bus or link to download the new code, the reprogrammable field device 40 is reprogrammed without sending a person to the physical location of the reprogrammable field device 40.

By using the standard communications protocol, the host 18 (or controller 12) can download code to multiple reprogrammable field devices 40 without interrupting the operation of the system 10 so that the devices 40 can be reprogrammed simultaneously during a single period in which process control is interrupted. For example, in the Fieldbus protocol, a controller's associated I/O device can either transmit broadcast messages to all the devices 40 being reprogrammed, or publish messages to the individual devices 40 over a period of multiple macrocycles. In the HART protocol, each reprogrammable field device 40 has a dedicated connection such that code may be simultaneously downloaded by the controller 12 to multiple devices 40. After all the devices 40 have received and stored the downloaded code from the host 18 or controller 12, the reprogramming cycle for the devices 40 can be initiated in a manner more fully described below during a single period in which process control is interrupted.

Once the download and storage of the new code is complete, the reprogrammable field device 40 is ready to be reprogrammed to execute the downloaded code. At this point, the host 18 verifies that the reprogrammable field device 40 is ready for the reprogramming cycle. The verification may include transmitting an instruction to the reprogrammable field device 40 to compute a checksum on the downloaded data to verify that the data received by the reprogrammable field device 40 matches the data transmitted by the host 18. If the verification operation indicates that the download was unsuccessful, the host 18 may reinitiate the download sequence, issue a notification to the operator that the download was unsuccessful, or perform some other preprogrammed error handling function.

If the download was successful, the host 18 issues a command, in either the initial verification message or a subsequent message, for the reprogrammable field device 40 to prepare for reprogramming. Depending on the requirements of the particular reprogrammable field device 40, the operational mode of the reprogrammable field device 40 during the reprogramming cycle will vary. For example, a controlling instrument such as a valve positioner may require being taken out of service completely while the device is reprogrammed. While the valve positioner is out of service, it may be necessary for the host 18 or controller 12 to notify other field devices 14, 15, 40 and control modules 24 that the valve positioner is out of service. The notification by the host 18 or controller 12 may also include instructions to change the operational state of one or more of the field devices 14, 15, 40 or control modules 24 while the valve positioner or other reprogrammable field device 40 is reprogrammed. For other reprogrammable field devices 40, such as transmitters, the host 18 may instruct the reprogrammable field device 40 to operate at a steady state and to transmit process control information with a constant value, such as a steady flow rate, while the reprogrammable field device 40 is reprogrammed. In other cases, the host 18/controller 12 may override the process control loop in place of the reprogrammable field device 40 during the reprogramming cycle and communicate directly with the other devices 14, 15, 40 and control modules 24 in the control loop to allow them to operate under seminormal operating conditions. The host 18/controller 12, reprogrammable field device 40, other field devices 14, 15, 40 and the control modules 24 may be required to operate under other types of modified operating modes depending on the particular requirements of the field devices 14, 15, 40, control loops and process control system 10.

Once the reprogrammable field device 40 and the process control system 10 are prepared by the host 18/controller 12, the host 18/controller 12 transmits a message to the reprogrammable field device 40 with an instruction for the reprogrammable field device 40 to begin reprogramming itself. The reprogrammable field device 40 may reprogram itself via one of the reprogramming methods previously described, such as by copying the downloaded code from the second memory 46 to the first memory 44 or changing the pointer in the transfer unit 48 to cause the CPU 42 to execute the downloaded code in the previously idle memory, or by any other method that is dictated by the hardware configuration of the reprogrammable field device 40. After the reprogrammable field device 40 is reprogrammed, communications between the host 18/controller 12 and the reprogrammable field device 40 must be reestablished so the reprogrammable field device 40 can return to its normal operational mode for implementation of process control. Communications may be reestablished by a response message from the reprogrammable field device 40 to the host 18/controller 12 after the device 40 is successfully reprogrammed, or by the host 18/controller 12 transmitting a restart message to the reprogrammable field device 40 after a predetermined period of time.

The method and device of the present invention as described herein facilitate downloading code to the reprogrammable field devices 40 over the network without affecting the process control performed by the process control system 10. The method and device constitute a significant enhancement over previously known methods of downloading code to field devices wherein no process control could be performed for the duration of downloading the code and reprogramming the field device. For example, in a process control system using the HART protocol, 15 minutes is required to download 30 Kb of data to a previously known field device and 15 seconds is required to reprogram the device, resulting in about a 16 minute interruption in process control. Using the method and device according to the present invention, the 30 Kb data is downloaded to the reprogrammable field device 40 in the digital overlay while process control information is simultaneously transmitted in the analog signal, and process control is interrupted for less than one minute when the device 40 is reprogrammed. Moreover, the field device does not need to be physically manipulated to reprogram, i.e., no trip to the instrument, no opening the instrument, etc., thereby reducing the labor costs associated with reprogramming field devices and the cost of lost network operating time caused by taking the control loops out of service.

In addition to reducing the impact on the process control, implementation of the method and device according to the present invention is simplified by using the standard communications protocol already existing in the process control system. The method can be used in any protocol the supports writing blocks of data in some format. Consequently, no additional coding is required for functions such as communicating the code, error checking, and the like that are already executed by the communications protocol.

When implemented, any of the software or firmware described herein may be stored in any computer readable memory such as on a magnetic disk, a laser disk, or other storage medium, in a RAM or ROM of a computer or processor, etc. Likewise, the software may be delivered to a user, a process control system, or the host 18 via any known or desired delivery method including, for example, on a computer readable disk or other transportable computer storage mechanism or over a communication channel such as a telephone line, the Internet, the World Wide Web, any other local area network or wide area network, etc. (which delivery is viewed as being the same as or interchangeable with providing such software or firmware via a transportable storage medium). Furthermore, the software or firmware may be provided directly without modulation or may be modulated using any suitable modulation carrier wave before being transmitted over a communication channel.

Thus, while the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of reprogramming a field device in a process control network having a plurality of devices which are communicatively linked on a bus and which use a standard communication protocol to perform process control functions, the method comprising the steps of:

downloading program instructions from a host device over the bus to one of the field devices having a storage device having a first memory portion with stored program instructions and a second memory portion using the standard communication protocol during operation of the process control network while the one of the field devices is enabled to execute the stored program instructions that will be replaced by the downloaded program instructions to perform process control;

storing the downloaded program instructions in the second memory portion of the storage device while the one of the field devices is enabled to execute the stored program instructions that will be replaced by the downloaded program instructions to perform process control, wherein the one of the field devices alternately receives and stores the downloaded program instructions and executes the stored program instructions to perform process control until the downloaded program instructions are fully downloaded and stored in the second memory portion; and causing the field device to discontinue executing the stored program instructions to perform process control and to execute the downloaded program instructions to perform process control.

2. A method of reprogramming a field device in a process control network according to claim 1, wherein the downloading step comprises the step of transmitting the program instructions from the host device to the one of the field devices using unscheduled queued communications.

3. A method of reprogramming a field device in a process control network according to claim 2, wherein the downloading step comprises the step of transmitting the program instructions from the host device to the one of the field devices using a plurality of unscheduled queued communications.

4. A method of reprogramming a field device in a process control network according to claim 1, wherein the causing step comprises the step of copying the downloaded program instructions from the second memory portion of the storage device to the first memory portion.

5. A method of reprogramming a field device in a process control network according to claim 1, wherein the causing step comprises the step of redirecting the one of the field devices from executing the stored program instructions in the first memory portion of the storage device to executing the downloaded program instructions in the second memory portion.

6. A method of reprogramming a field device in a process control network according to claim 1, wherein the causing step comprises the steps of:
    ceasing the execution of the stored program instructions in the first memory portion;
    copying the downloaded program instructions from the second memory portion to the first memory portion;
    initiating the execution of the downloaded program instructions in the first memory portion.

7. A method of reprogramming a field device in a process control network according to claim 1, wherein the causing step comprises the steps of:
    ceasing the execution of the stored program instructions in the first memory portion;
    redirecting the field device to execute the downloaded program instructions in the second memory portion;
    initiating the execution of the downloaded program instructions in the second memory portion.

8. A method of reprogramming a field device in a process control network according to claim 1, wherein the standard communications protocol is the Fieldbus protocol.

9. A method of reprogramming a field device in a process control network according to claim 1, wherein the standard communications protocol is the HART protocol.

10. A method of reprogramming a field device in a process control network according to claim 1, wherein the storage device is a non-volatile memory storage device configured to allow simultaneous reading and writing operations such that the one of the field devices can store downloaded program instructions in the second memory portion simultaneously with executing program instructions stored in the first memory portion.

11. A method of reprogramming a field device in a process control network according to claim 1, comprising:
    detecting an error in the downloaded program instructions; and
    causing the field device to discontinue executing the downloaded program instructions to perform process control and to execute the stored program instructions to perform process control in response to detecting the error in the downloaded program instructions.

12. A system for reprogramming a field device in a process control network having a plurality of field devices communicatively linked over a bus, wherein each of the field devices is capable of communicating on the bus using a standard communications protocol during operation of the process control network, the system comprising:
    a first device that generates downloadable program instructions and that transmits the downloadable program instructions over the bus using the standard communication protocol; and
    a second device capable of receiving the downloadable program instructions transmitted over the bus, the second device comprising:
        a processor adapted to execute a set of program instructions stored in the second device;
        a storage device having a first memory portion adapted to store a first set of program instructions that may be executed by the processor, and a second memory portion adapted to store the downloadable program instructions transmitted over the bus;
    wherein the first device transmits the downloadable program instructions to the second device and the second device receives the downloadable program instructions and stores the downloadable program instructions in the second memory portion of the storage device during operation of the process control network while the second device is enabled to execute the first set of program instructions that will be replaced by the downloadable program instructions to perform process control;
    wherein the second device alternately receives and stores the downloadable program instructions and executes the first set of program instructions to perform process control until the downloadable program instructions are fully downloaded and stored in the second memory portion; and
    wherein the processor discontinues executing the first set of program instructions to perform process control and begins executing the downloadable program instructions to perform process control after the downloadable program instructions are stored in the second memory portion of the storage device.

13. A system for reprogramming a field device according to claim 12, wherein the standard communication protocol includes scheduled and unscheduled communications and the first device transmits the downloadable program instructions to the second device using unscheduled communications.

14. A system for reprogramming a field device according to claim 12, wherein the standard communication protocol includes concurrent analog and digital communications and the first device transmits the downloadable program instructions to the second device using digital communications.

15. A system for reprogramming a field device according to claim 12, wherein the storage device is a non-volatile memory and the second device stores the downloadable program instructions in the second memory portion of the non-volatile memory while the processor is enabled to execute program instructions stored in the first memory portion of the non-volatile memory to perform process control, and wherein the second device includes a transfer unit that disables the processor from executing program instructions stored in the first memory portion after the downloadable program instructions are stored in the second memory portion, that copies the downloadable program instructions from the second memory portion to of the first memory portion while the processor is disabled, and that reenables the processor to execute the downloadable program instructions stored in the first memory portion after the downloadable program instructions are copied.

16. A system for reprogramming a field devices according to claim 15, wherein the second device further comprises a transfer unit having a memory adapted to store information causing the processor to execute the program instructions stored in one of the first memory portion and the second memory portion of the storage device, and wherein the transfer unit stores the downloadable program instructions in the other of the first memory portion and the second memory portion while the processor is enabled to execute program instructions stored in the one of the first memory portion and the second memory portion to perform process control, disables the processor from executing program instructions stored in the one of the first memory portion and the second memory portion after the downloadable program instructions are stored in the other of the first memory portion and the second memory portion, updates the stored information in the transfer unit memory to cause the processor to execute the downloadable program instructions stored in the other of the first memory portion and the second memory portion while the processor is disabled, and reenables the processor to execute the downloadable program instructions stored in the other of the first memory portion and the second memory portion after the transfer unit memory is updated.

17. A system for reprogramming a field devices according to claim 12, wherein the storage device is a non-volatile memory storage device configured to allow simultaneous reading and writing operations such that the second device can store downloaded program instructions in the second memory portion simultaneously with the processor executing the first set of program instructions stored in the first memory portion.

18. A system for reprogramming a field device according to claim 12, wherein the processor detects an error in the downloaded program instructions, wherein the processor causes the field device to discontinue executing the downloaded program instructions to perform process control and to execute the stored program instructions to perform process control in response to detecting the error in the downloaded program instructions.

19. A reprogrammable field device capable of being used in a process control network having a plurality of devices communicatively coupled to a bus, wherein each of the devices is capable of communicating on the bus using a standard communications protocol, and wherein a host device is capable of generating input signals including downloadable program instructions and transmitting the input signals to the reprogrammable field device over the bus during operation of the process control network while the reprogrammable field device is enabled to perform process control, the reprogrammable field device comprising:

a processor adapted to execute a set of program instructions stored in the reprogrammable field device;
a storage device comprising:
a first memory portion adapted to store a first set of program instructions that may be executed by the processor, and
a second memory portion adapted to store the downloadable program instructions transmitted over the bus;
wherein the reprogrammable field device receives the downloadable program instructions and stores the downloadable program instructions in the second memory portion of the storage device during operation of the process control network while the reprogrammable device is enabled to execute the first set of program instructions that will be replaced by the downloadable program instructions to perform process control;
wherein the reprogrammable field device alternately receives and stores the downloadable program instructions and executes the first set of program instructions to perform process control until the downloadable program instructions are fully downloaded and stored in the second memory portion; and
wherein the processor discontinues executing the first set of program instructions to perform process control and begins executing the downloadable program instructions to perform process control after the downloadable program instructions are stored in the second memory portion.

20. A reprogrammable field device according to claim 19, wherein the standard communication protocol includes scheduled and unscheduled communications and the host device transmits the downloadable program instructions to the reprogrammable field device using unscheduled communications.

21. A reprogrammable field device according to claim 19, wherein the standard communication protocol includes concurrent analog and digital communications and the host device transmits the downloadable program instructions to the reprogrammable field device using digital communications.

22. A reprogrammable field device according to claim 19, wherein the storage device is a non volatile memory and the reprogrammable field device stores the downloadable program instructions in the second memory portion while the processor is enabled to execute program instructions stored in the first memory portion to perform process control, and wherein the reprogrammable field device further comprises a transfer unit that disables the processor from executing program instructions stored in the first memory portion after the downloadable program instructions are stored in the second memory portion, copies the downloadable program instructions from the second memory portion to the first memory portion while the processor is disabled, and reenables the processor to execute the downloadable program instructions stored in the first memory portion after the downloadable program instructions are copied.

23. A reprogrammable field device according to claim 22, further comprising a transfer unit adapted to store information causing the processor to execute the program instructions stored in one of the first memory portion and the second memory portion, wherein the transfer unit stores the downloadable program instructions in the other of the first memory portion and the second memory portion while the processor is enabled to execute program instructions stored in the one of the first memory portion and the second memory portion to perform process control, disables the processor from executing program instructions stored in the one of the first memory portion and the second memory portion after the downloadable program instructions are stored in the other of the first memory portion and the second memory portion, updates the stored information to cause the processor to execute the downloadable program instructions stored in the other of the first memory portion and the second memory portion while the processor is disabled, and reenables the processor to execute the downloadable program instructions stored in the other of the first memory portion and the second memory portion after the third memory is updated.

24. A reprogrammable field device according to claim 19, wherein the storage device is a non-volatile memory storage device configured to allow simultaneous reading and writing operations such that the reprogrammable field device can store downloaded program instructions in the second memory portion simultaneously with the processor executing the first set of program instructions stored in the first memory portion.

25. A reprogrammable field device according to claim 19, wherein the processor detects an error in the downloaded program instructions, and wherein the processor causes the field device to discontinue executing the downloaded program instructions to perform process control and to execute the stored program instructions to perform process control in response to detecting the error in the downloaded program instructions.

26. A method of reprogramming a field device in a process control network having a plurality of devices which are communicatively linked on a bus to perform process control functions, the method comprising the steps of:
   downloading program instructions from a host device to one of the field devices wherein the host device divides the program instructions into a plurality of data packets that are downloaded to the one of the field devices over time while the one of the field devices is enabled to perform process control;
   reassembling the downloaded data packets into the program instructions in the field device;
   storing the downloaded program instructions in the one of the field devices, wherein the one of the field devices has a storage device having a first memory portion with stored program instructions and a second memory portion, and wherein the downloaded program instructions are stored in the second memory portion of the storage device while the one of the field devices is capable of executing the stored program instructions to perform process control, wherein the one of the field devices alternately receives and stores the downloaded program instructions and executes the stored program instructions to perform process control until the downloaded program instructions are fully downloaded and stored in the second memory portion; and
   causing the field device to execute the downloaded program instructions.

27. A method of reprogramming a field device in a process control network according to claim 26, wherein the causing step comprises the step of copying the downloaded program instructions from the second memory portion to the first memory portion.

28. A method of reprogramming a field device in a process control network according to claim 26, wherein the causing step comprises the step of redirecting the one of the field devices from executing the stored program instructions in the first memory portion to executing the downloaded program instructions in the second memory portion.

29. A method of reprogramming a field device in a process control network according to claim 26, wherein the causing step comprises the steps of:
   ceasing the execution of the stored program instructions in the first memory portion;
   copying the downloaded program instructions from the second memory portion to the first memory portion;
   initiating the execution of the downloaded program instructions in the first memory portion.

30. A method of reprogramming a field device in a process control network according to claim 26, wherein the causing step comprises the steps of:
   ceasing the execution of the stored program instructions in the first memory portion;
   redirecting the field device to execute the downloaded program instructions in the second memory portion;
   initiating the execution of the downloaded program instructions in the second memory portion.

31. A method of reprogramming a field device in a process control network according to claim 26, wherein the plurality of devices communicate using a standard communication protocol.

32. A method of reprogramming a field device in a process control network according to claim 26, wherein the storage device is a non-volatile memory storage device configured to allow simultaneous reading and writing operations such that the one of the field devices can store downloaded program instructions in the second memory portion simultaneously with executing program instructions stored in the first memory portion.

33. A method of reprogramming a field device in a process control network according to claim 26, comprising:
   detecting an error in the downloaded program instructions; and
   causing the field device to discontinue executing the downloaded program instructions to perform process control and to execute the stored program instructions to perform process control in response to detecting the error in the downloaded program instructions.

34. A system for reprogramming a field device in a process control network having a plurality of field devices communicatively linked over a bus, wherein each of the field devices is capable of communicating on the bus during operation of the process control network, the system comprising:
   a first device that divides downloadable program instructions into a plurality of data packets and that transmits the data packets over the bus; and
   a second device capable of receiving the data packets transmitted over the bus and reassembling the data packets into the downloadable program instructions, the second device comprising:
      a processor adapted to execute a set of program instructions stored in the second device;
      a storage device having a first memory portion adapted to store a first set of program instructions that may be executed by the processor, and a second memory portion adapted to store the downloadable program instructions transmitted over the bus;
   wherein the first device transmits the data packets to the second device and the second device receives the data packets, reassembles the data packets into the downloadable program instructions, and stores the program instructions in the second memory portion during operation of the process control network while the second device is enabled to perform process control; and
   wherein the second device alternately receives and stores the downloadable program instructions and executes the first set of program instructions to perform process control until the downloadable program instructions are fully downloaded and stored in the second memory portion.

35. A system for reprogramming a field device according to claim 34, wherein the field devices communicate using scheduled and unscheduled communications and the first device transmits the data packets to the second device using unscheduled communications.

36. A system for reprogramming a field device according to claim 34, wherein the field devices communicate using concurrent analog and digital communications and the first device transmits the data packets to the second device using digital communications.

37. A system for reprogramming a field device according to claim 34, wherein the storage device is a non volatile memory and the second device stores the downloadable program instructions in the second memory portion while the processor is enabled to execute program instructions stored in the first memory portion to perform process control, and wherein the second device includes a transfer unit that disables the processor from executing program instructions stored in the first memory portion after the downloadable program instructions are stored in the second memory portion, that copies the downloadable program instructions from the second memory portion to the first memory portion while the processor is disabled, and that reenables the processor to execute the downloadable program instructions stored in the first memory portion after the downloadable program instructions are copied.

38. A system for reprogramming a field devices according to claim 34, wherein the second device further comprises a transfer unit having a memory adapted to store information causing the processor to execute the program instructions stored in one of the first memory portion and the second memory portion, and wherein the transfer unit stores the downloadable program instructions in the other of the first memory portion and the second memory portion while the processor is enabled to execute program instructions stored in the one of the first memory portion and the second memory portion to perform process control, disables the processor from executing program instructions stored in the one of the first memory portion and the second memory portion after the downloadable program instructions are stored in the other of the first memory portion and the second memory portion, updates the stored information in the transfer unit memory to cause the processor to execute the downloadable program instructions stored in the other of the first memory portion and the second memory portion while the processor is disabled, and reenables the processor to execute the downloadable program instructions stored in the other of the first memory portion and the second memory portion after the transfer unit memory is updated.

39. A system for reprogramming a field devices according to claim 34, wherein the storage device is a non-volatile memory storage device configured to allow simultaneous reading and writing operations such that the second device can store downloaded program instructions in the second memory portion simultaneously with the processor executing the first set of program instructions stored in the first memory portion.

40. A system for reprogramming a field device according to claim 34, wherein the processor detects an error in the downloaded program instructions, wherein the processor causes the field device to discontinue executing the downloaded program instructions to perform process control and to execute the stored program instructions to perform process control in response to detecting the error in the downloaded program instructions.

* * * * *

UNITED STATES PATENT AND TRADEMARK OFFICE
CERTIFICATE OF CORRECTION

PATENT NO. : 7,580,992 B2  
APPLICATION NO. : 10/886272  
DATED : August 25, 2009  
INVENTOR(S) : Clyde T. Eisenbeis et al.

It is certified that error appears in the above-identified patent and that said Letters Patent is hereby corrected as shown below:

In the Claims:

At Column 17, line 6, "to of" should be -- to --.

At Column 17, line 34, "devices" should be -- device --.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

PATENT NO. : 7,580,992 B2  Page 1 of 1
APPLICATION NO. : 10/886272
DATED : August 25, 2009
INVENTOR(S) : Clyde T. Eisenbeis et al.

It is certified that error appears in the above-identified patent and that said Letters Patent is hereby corrected as shown below:

On the Title Page:

At field (73), "Marshalltown, IA" should be -- St. Louis, MO --.

Signed and Sealed this

Twenty-first Day of September, 2010

David J. Kappos
*Director of the United States Patent and Trademark Office*